(12) United States Patent
Tastekin

(10) Patent No.: US 9,941,806 B2
(45) Date of Patent: Apr. 10, 2018

(54) MODULATION METHOD FOR THE BOOST CONVERTER OPERATING MODE OF A PUSH-PULL CONVERTER

(71) Applicant: Robert Bosch GmbH, Stuttgart (DE)

(72) Inventor: David Tastekin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/126,917

(22) PCT Filed: Jan. 29, 2015

(86) PCT No.: PCT/EP2015/051789
§ 371 (c)(1),
(2) Date: Sep. 16, 2016

(87) PCT Pub. No.: WO2015/144338
PCT Pub. Date: Oct. 1, 2015

(65) Prior Publication Data
US 2017/0093288 A1  Mar. 30, 2017

(30) Foreign Application Priority Data

Mar. 26, 2014 (DE) .................. 10 2014 205 652

(51) Int. Cl.
*H02M 3/335* (2006.01)
*H02M 3/337* (2006.01)
(Continued)

(52) U.S. Cl.
CPC ........... *H02M 3/3378* (2013.01); *H02M 1/08* (2013.01); *H02M 2001/0009* (2013.01)

(58) Field of Classification Search
CPC ...... H02M 1/36; H02M 3/285; H02M 3/3376; H02M 3/337
(Continued)

(56) References Cited

U.S. PATENT DOCUMENTS 5,255,174 A * 10/1993 Murugan .......... H02M 3/33584
318/376
6,111,767 A *  8/2000 Handleman ............... G05F 1/67
136/293
(Continued)

FOREIGN PATENT DOCUMENTS

JP    2014079108    5/2014

*Primary Examiner* — Rajnikant Patel
(74) *Attorney, Agent, or Firm* — Michael Best & Friedrich LLP

(57) ABSTRACT

The invention relates to a method for modulating the boost converter operating mode of a push-pull converter having a low-voltage-side circuit, having a first low-voltage-side switching device and a second low-voltage-side switching device; having a transformer having a high-voltage-side winding; and having a high-voltage-side circuit, which is configured as a full-bridge rectifier, having a first and a second rectification element which form a first half-bridge and a third and a fourth rectification element which form a second half-bridge; wherein the method comprises the steps of closing the first low-voltage-side switching device while simultaneously short-circuiting the high-voltage-side winding via the first or the fourth rectification element during a first time segment; opening the rectification element used for short-circuiting the high-voltage-side winding during a second time segment; opening the first low-voltage-side switching device and closing the second low-voltage-side switching device while simultaneously short-circuiting the high-voltage-side winding via the third or the fourth rectification element in the second half-bridge during a third time segment; and opening the rectification element used for short-circuiting the high-voltage-side winding during a fourth time segment.

7 Claims, 4 Drawing Sheets

(51) Int. Cl.
*H02M 1/08* (2006.01)
*H02M 1/00* (2006.01)

(58) Field of Classification Search
USPC ........ 363/17, 20, 21.02–21.06, 21.07, 21.11,
363/26, 35.5, 131; 323/225, 229, 266
See application file for complete search history.

(56) References Cited

U.S. PATENT DOCUMENTS

| | | | |
|---|---|---|---|
| 6,728,118 B1* | 4/2004 | Chen | H02M 3/33592 |
| | | | 363/24 |
| 7,660,134 B2* | 2/2010 | Imai | H02M 1/32 |
| | | | 363/17 |
| 7,701,736 B2* | 4/2010 | Yang | H02M 3/33592 |
| | | | 363/127 |
| 8,503,199 B1 | 8/2013 | Chapuis et al. | |
| 9,350,259 B2* | 5/2016 | Ou | H02M 3/33592 |
| 9,391,532 B2* | 7/2016 | Reiter | H02M 3/3376 |
| 2012/0327688 A1* | 12/2012 | Guthrie | H02M 1/36 |
| | | | 363/15 |

* cited by examiner

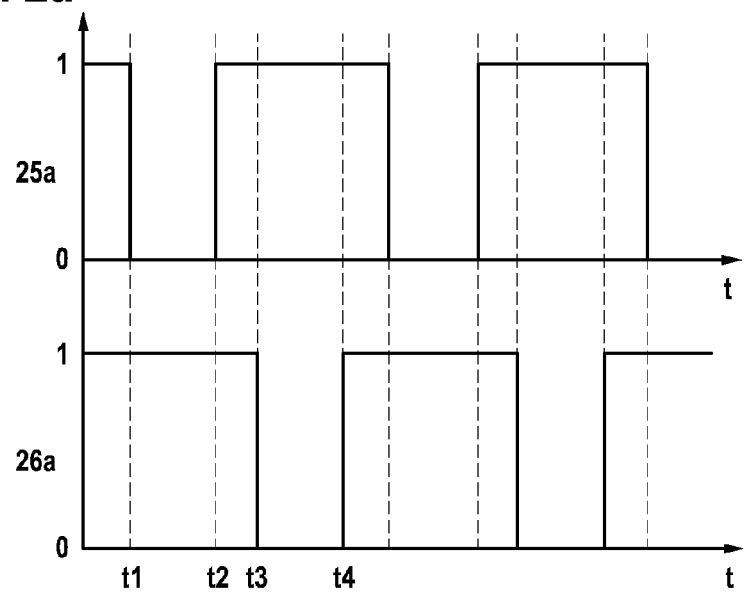
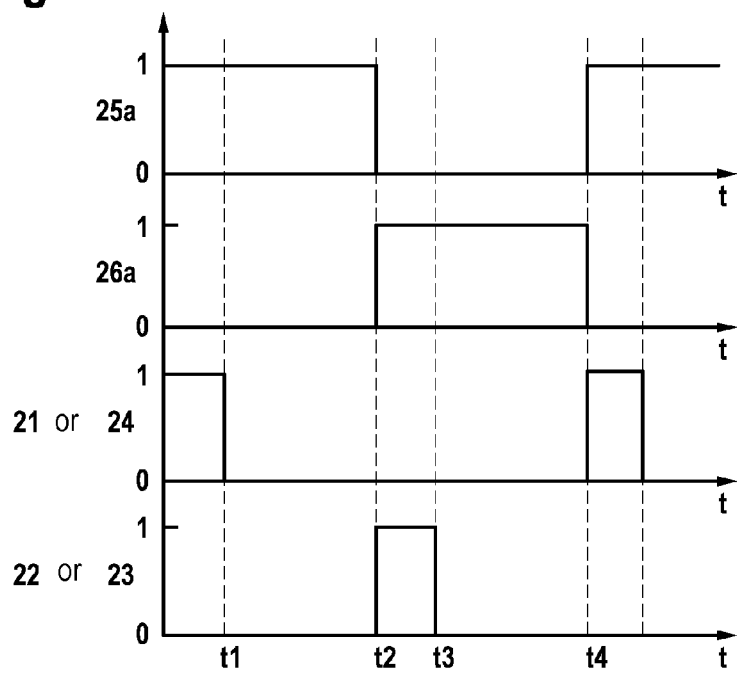

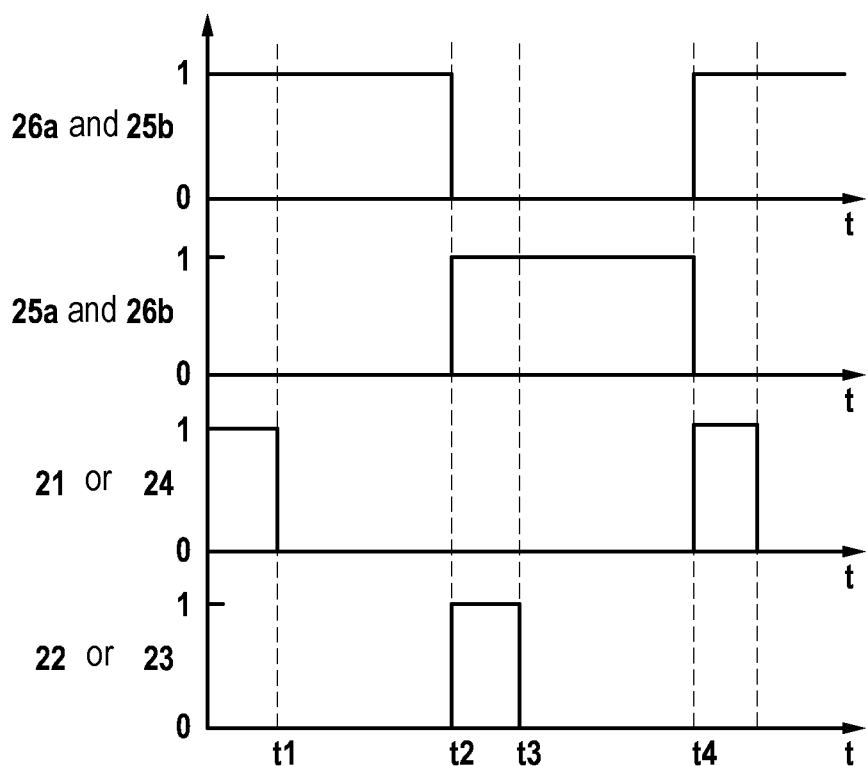

MODULATION METHOD FOR THE BOOST CONVERTER OPERATING MODE OF A PUSH-PULL CONVERTER

BACKGROUND OF THE INVENTION

The invention relates to a method for modulating the boost converter operating mode of a push-pull converter. The invention particularly relates to a method for modulating the boost converter operating mode of a bidirectional push-pull converter.

Although the present invention and the underlying set of issues are explained with the help of a bidirectional push-pull converter, said invention can also be applied to any other push-pull converters, in which a boost converter operating mode is provided.

Bidirectional DC-DC converters are typically used in situations where electrical energy is to be transmitted in two directions. Said bidirectional DC-DC converters are therefore useful in hybrid electric vehicles for transmitting energy for a high-voltage network to a low-voltage network and vice versa. For example, a 12 volt battery can be charged with the help of a DC-DC converter in the buck converter operating mode, whereas the boost converter operating mode can be used as required for charging or respectively for operating an auxiliary energy storage system for the short-term power requirement (for example during startup) of several hundred volts. Depending on the application, a galvanic separation between the high-voltage and low-voltage side is required for the DC-DC converter so that it is advantageous in some cases to embody the DC-DC converter as a push-pull converter.

The printed publication: Nene H., "Digital Control of a Bidirectional DC-DC Converter for Automotive Applications", Applied Power Electronics Conference and Exposition (APEC), Long Beach (Calif.), USA, 17-21 Mar. 2013 (doi: 10.1109/APEC.2013.6520476) describes a bidirectional push-pull converter, which is configured on the high-voltage side with a full bridge circuit and on the low-voltage side with a center tap. Furthermore, a current sensor device is provided on the high-voltage side, which is designed to measure the current through the transformer. In the buck converter operating mode, the so-called phase-shifted method is used as the modulation method for actuating the push-pull converter. In the boost converter operating mode, a method is used, in which no current flows in phases on the high-voltage side.

Up until now, an additional current sensor device has been required in the low-voltage circuit for the controlled boost converter operating mode. This makes a complicated configuration of the low-voltage circuit necessary.

SUMMARY OF THE INVENTION

The present invention relates to a method for modulating the boost converter operating mode of a push-pull converter having a low-voltage-side circuit, which is designed to convert a DC voltage applied to a low-voltage side into a low-voltage-side AC voltage, having a first low-voltage-side switching device, a second low-voltage-side switching device and a throttle; having a transformer having a low-voltage-side winding and a high-voltage-side winding, said transformer being designed to receive the low-voltage-side AC voltage at the low-voltage-side winding and to generate a high-voltage-side AC voltage at the high-voltage-side winding; and having a high-voltage-side circuit, which is configured as a full-bridge rectifier in order to convert the high-voltage-side AC voltage into a high-voltage-side DC voltage, having a first and a second rectification element which form a first half-bridge and a third and fourth rectification element which form a second half-bridge, wherein at least the first or the fourth rectification element is designed as a switching element and wherein the second or the third rectification element is designed as a switching device; wherein the method comprises the steps of closing the first low-voltage-side switching device in order to generate a first voltage at the transformer and to feed energy into the transformer and the throttle whilst simultaneously short-circuiting the high-voltage-side winding via the first or the fourth rectification element during a first time segment of a modulation cycle; opening the first low-voltage-side switching device and closing the second low-voltage-side switching device in order to generate a second voltage at the transformer which has the opposite polarity of the first voltage, whilst simultaneously short-circuiting the high-voltage winding via the second or the third rectification element of the second half-bridge during a third time segment of the modulation cycle; and opening the rectification element used for short-circuiting the high-voltage-side winding in order to generate a high-voltage-side DC voltage during a fourth time segment of the modulation cycle.

It is a concept of the present invention to create a method for modulating the boost converter operating mode of a push-pull converter, which makes a controlled operation possible without a current sensor device being necessary on the low-voltage side. The current is hereby measured by means of a current sensor device located on the high-voltage side. To this end, the method additionally uses switching devices on the high-voltage side in the boost converter operating mode in order to control the power flow or respectively the current. A current flows at any time through the high-voltage-side winding as well as through the low-voltage-side winding of the transformer; thus enabling said current to be measured or respectively controlled at any time by means of a single current sensor device on the high-voltage side. A significant advantage of the inventive solution is that conventional push-pull converters can be operated in a controlled manner in the boost converter operating mode without an additional current sensor device having to be installed on the low-voltage side in a complex fashion.

According to one preferred modification to the invention, the low-voltage-side circuit can be designed as a center-tap connection comprising the first low-voltage-side and the second low-voltage-side switching device as well as the throttle. This modification to the low-voltage-side circuit is a simple implementation of a circuit arrangement which can be used to actuate a push-pull converter in the boost converter operating mode.

According to an alternative preferred modification to the invention, the low-voltage-side circuit furthermore comprises a third low-voltage-side switching device and a fourth low-voltage-side switching device. In addition, the low-voltage-side circuit is configured as a full-bridge circuit comprising the first low-voltage-side, the second low-voltage-side, the third low-voltage-side and the fourth low-voltage side switching device as well as the throttle. Furthermore, the opening as well as the closing of the first low-voltage-side switching device can in each case be accompanied by a simultaneous opening and closing of the fourth low-voltage-side switching device, and the opening and the closing of the second low-voltage-side switching device can in each case be accompanied by a simultaneous opening and closing of the third low-voltage-side switching device. This modification to the low-voltage-side circuit is an alternative implementation of a circuit arrangement which can be used to actuate a push-pull converter in the boost converter operating mode.

The low-voltage-side and high-voltage-side switching devices can preferably comprise MOSFETs (metal-oxide-semiconductor field-effect transistors), IGBTs (bipolar transistors having an insulated gate electrode), JFETs (junction gate field-effect transistors) and/or BJTs (bipolar transistors) or respectively other suitable semiconductor switches. The switching device thus advantageously contains actively switchable semiconductor components, as said components can be integrated in miniaturized form in large numbers in a single semiconductor substrate.

In a preferred manner, the low-voltage-side and/or the high-voltage-side switching devices can furthermore be designed as synchronous rectifiers. Synchronous rectifiers constitute a simple option for rectification. No additional diodes are thus, for example, required.

According to one preferred modification to the invention, a diode can be connected in each case in an anti-parallel manner to the low-voltage-side and high-voltage-side switching devices. In this modification, the diodes can be used for rectification and the switching devices do not have to be designed as synchronous rectifiers.

According to one preferred modification to the invention, the high-voltage-side rectification elements can be designed as switching devices. In consecutive modulation cycles in the first time segment, the first as well as the fourth rectification element can furthermore in each case be alternatively used for short-circuiting the high-voltage winding; and in consecutive modulation cycles in the third time segment, the third as well as second rectification element can furthermore in each case be alternatively used for short-circuiting the high-voltage winding. This has the advantage that losses per switching device can be reduced and additionally the service life of the switching devices can be increased.

BRIEF DESCRIPTION OF THE DRAWINGS

Further features and advantages of the present invention are explained below using the embodiments with reference to the figures in the drawings.

In the drawings:

FIG. 2a shows a temporal progression diagram of actuating signals of an exemplary method for modulating the boost converter operating mode of a bidirectional push-pull converter;

FIG. 2b shows a temporal progression diagram of actuating signals of a method for modulating the boost converter operating mode of a bidirectional push-pull converter according to one embodiment of the invention;

FIG. 4 shows a temporal progression diagram of actuating signals of a method for modulating the boost converter operating node of a bidirectional push-pull converter according to a further embodiment of the invention.

DETAILED DESCRIPTION

In the figures of the drawings, identical reference signs denote identical or functionally identical elements.

Figure 1:
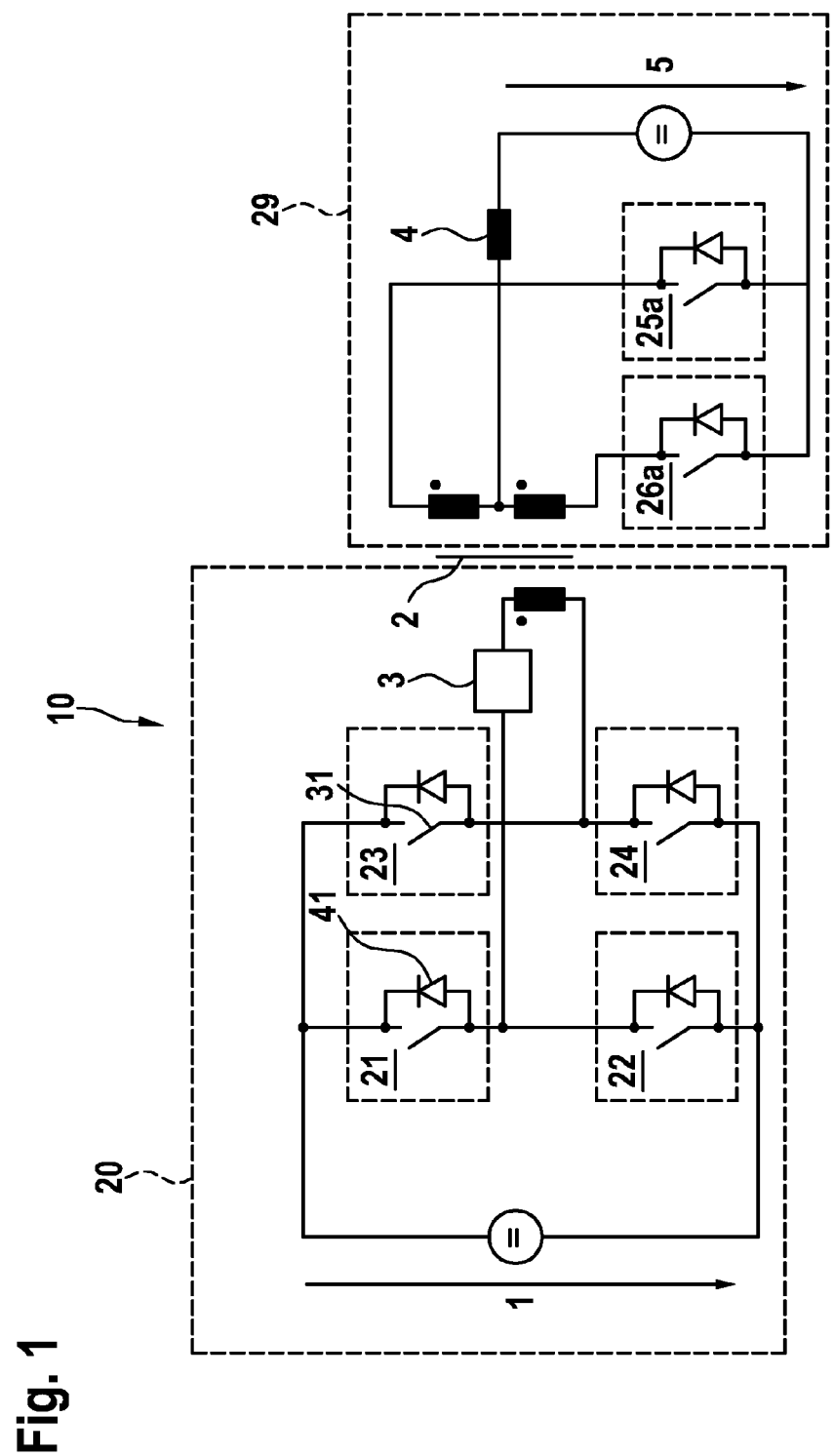
FIG. 1 shows a schematic depiction of an exemplary bidirectional push-pull converter.

FIG. 1 shows a schematic depiction of an exemplary bidirectional push-pull converter.

In FIG. 1, the reference sign 10 denotes the push-pull converter. A full-bridge circuit comprising switching devices 21, 22, 23, 24 can be implemented here in a high-voltage-side circuit 20. A low-voltage-side circuit 29 is designed as a center-tap connection comprising switching devices 25a, 26a as well as a throttle 4. The high-voltage-side circuit 20 and the low-voltage-side circuit 29 are furthermore connected to one another in a galvanically isolating manner by means of a transformer 2. A current sensor device 3 is located within the high-voltage-side circuit, said current sensor device being designed to measure the current through the transformer 2. The switching devices 21, 22, 23, 24, 25a, 26a each comprise a transistor 31 and a diode 41. A DC voltage 1 can be applied to or respectively tapped at the high-voltage-side circuit 20 and correspondingly a DC voltage 5 on the low-voltage side.

In the buck converter operating mode, the high-voltage-side circuit 20 can transmit, on the basis of the phase-shifted method, a DC voltage 1 applied to the high-voltage side via the transformer 20 to the low-voltage-side circuit 29 by means of a correspondingly clocked switching of the transistors 31 of the switching devices 21, 22, 23, 24. Based on that, the low-voltage circuit 29 in turn provides a low-voltage-side DC voltage 5. In this embodiment, the diodes of the low-voltage-side circuit 29 are used as a center-tapped rectifiers.

In the boost converter operating mode, a method can be used in which no current flows in phases on the high-voltage side. In this case, only the transistors 31 of the switching devices 25a, 26a of the low-voltage-side circuit 29 are switched (parallel feed of the push-pull converter 10), whereas the diodes 41 of the switching devices 21, 22, 23, 24 are used as bridge rectifiers. A method or respectively a circuit arrangement in which the current can be evaluated at any time so that the push-pull converter 10 can correspondingly be controlled is required for a controlled boost converter operating mode of the push-pull converter 10 shown in FIG. 1. One approach would be to install a current sensor device 3 in the low-voltage-side circuit 29. This would make a complex configuration of the low-voltage-side circuit necessary.

FIG. 2a shows a temporal progression diagram of actuating signals of an exemplary method for modulating the boost converter operating mode of a bidirectional push-pull converter.

The modulation method depicted in FIG. 2a is used to actuate the push-pull converter 10 shown in FIG. 1 in the boost converter operating mode. The transistors 31 of the switching devices 25a, 26a of the low-voltage-side circuit 29 are switched here for the parallel feed of the push-pull converter. The diodes 41 of the switching devices 21, 22, 23, 24 are used as bridge rectifiers in the high-voltage-side circuit 20. The transistors 31 of the high-voltage-side switching devices 21, 22, 23, 24 are not switched in this method. In FIG. 2a, the switching states of the switching devices 25a, 26a are depicted as a function of time. The two switching devices 25a, 26a are switched on and off 180° out of phase with respect to each other. In phases, in which one of the switching devices 25a, 26a is open, energy is fed into the high-voltage-side DC voltage source and a current is induced there. A DC voltage 5 applied on the low-voltage side is simultaneously transformed into a high-voltage-side DC voltage 1. In a first time segment [0,t1] of a modulation cycle, both switching devices 25a, 26a are simultaneously closed in order for current to be built up and energy is fed into the throttle 4 and the transformer 2. In this time segment, the current on the high-voltage side is equal to zero. In a second time segment [t1,t2] of a modulation cycle, the switching device 25a is open while the switching device 26a remains closed. In a third time segment [t2,t3] both switching devices 25a, 26a are again closed. In a fourth time segment [t3,t4], the switching device 25a continues to remain closed, whereas the switching device 26a is now open. Hence, no current flows in phases on the high-voltage side.

FIG. 2b shows a temporal progression diagram of actuating signals of a method for modulating the boost converter operating mode of a bidirectional push-pull converter according to one embodiment of the invention.

The modulation method depicted in FIG. 2b is used to actuate the push-pull converter 10 shown in FIG. 1 in the boost converter operating mode. In contrast to the modulation method in FIG. 2a, a current flows at any time on the high-voltage side in this method. Like in FIG. 2a, the transistors 31 of the switching devices 25a, 26a of the low-voltage-side circuit 29 are also switched here for the parallel feed of the push-pull converter 10. Furthermore, the diodes 41 of the switching devices 21, 22, 23, 24 are also used here in the high-voltage-side circuit 20 as bridge rectifiers. In addition, respectively one of the transistors 31 of the high-voltage-side switching devices 21, 22, 23, 24 is, however, also switched in the method depicted in FIG. 2b. In a first time segment [0,t1] of a modulation cycle, switching device 25a is closed while switching device 26a is open. As a result, a first voltage is provided at the transformer 2 and energy is fed into the same as well as into the throttle 4. At the same time, one of the two transistors 31 of the first high-voltage pair comprising diagonally arranged switching devices 21, 24 is closed in this first time segment [0,t1]. Thus, the high-voltage-side winding of the transformer 2 is short-circuited so that no DC voltage 1 is generated at the high-voltage-side circuit 20. Nevertheless, a current is induced in the high-voltage-side circuit 20, which inter alia flows through the current sensor device 3 and can be measured there. In a second time segment [t1,t2] of a modulation cycle, the switching device 25a continues to remain open and switching device 26a continues to remain closed, while the switching device 21, 24 of the high-voltage-side circuit 20 closed in the first time segment [0,t1] is opened again. The high-voltage-side winding of the transformer 2 is now no longer short-circuited so that energy is fed into the high-voltage-side DC voltage source, a current is induced on the high-voltage side and a DC voltage 5 applied to the low-voltage side is simultaneously transformed into a high-voltage-side DC voltage 1. In a third time segment [t2,t3], the switching device 25a is opened and the switching device 26a closed. One of the two switching devices 22, 23 of the second high-voltage-side pair comprising diagonally arranged switching devices is simultaneously closed. Similarly as in the first time segment [0,t1], the high-voltage-side winding of the transformer 2 is also again short-circuited here so that a current flows through the high-voltage-side winding and the current sensor device 3 without a high-voltage-side DC voltage developing. In a fourth time segment [t3,t4], the previously closed switching device 22, 23 of the high-voltage side is again opened, while the low-voltage-side switching devices 25a, 26a maintain their current state.

Which of the high-voltage-side switching devices is closed in each case in the first [0,t1] or respectively third [t2,t3] time segment is arbitrary in this case. For example, either switching device 21 or switching device 24 is closed in the first time segment. Provision is made for an embodiment of the method in which the two switching devices 21, 24 are switched alternately in consecutive modulation cycles. This has the advantage that losses per switch can be reduced and the service life of the switches can be increased.

The application of the method according to the invention to the push-pull converter 10 in FIG. 1 is to be considered exemplary. Furthermore, the embodiment of the method in FIG. 2b serves as a model. The method can inter alia also be applied to other embodiments of push-pull converters 10. For example, provision is made for one embodiment of a push-pull converter 10 in which no diodes 41 are used but rather the transistors 31 are actuated as synchronous rectifiers. The technical embodiment of the transistors in FIG. 1 was not specified in detail. In principle, provision is made for embodiments as MOSFETs (metal-oxide-semiconductor field-effect transistor), IGBTs (bipolar transistors having an insulated gate electrode), JFETS (junction gate field-effect transistors) and/or BJTs (bipolar transistors), wherein other suitable technologies for semiconductor switches can, however, also be used.

Figure 3:
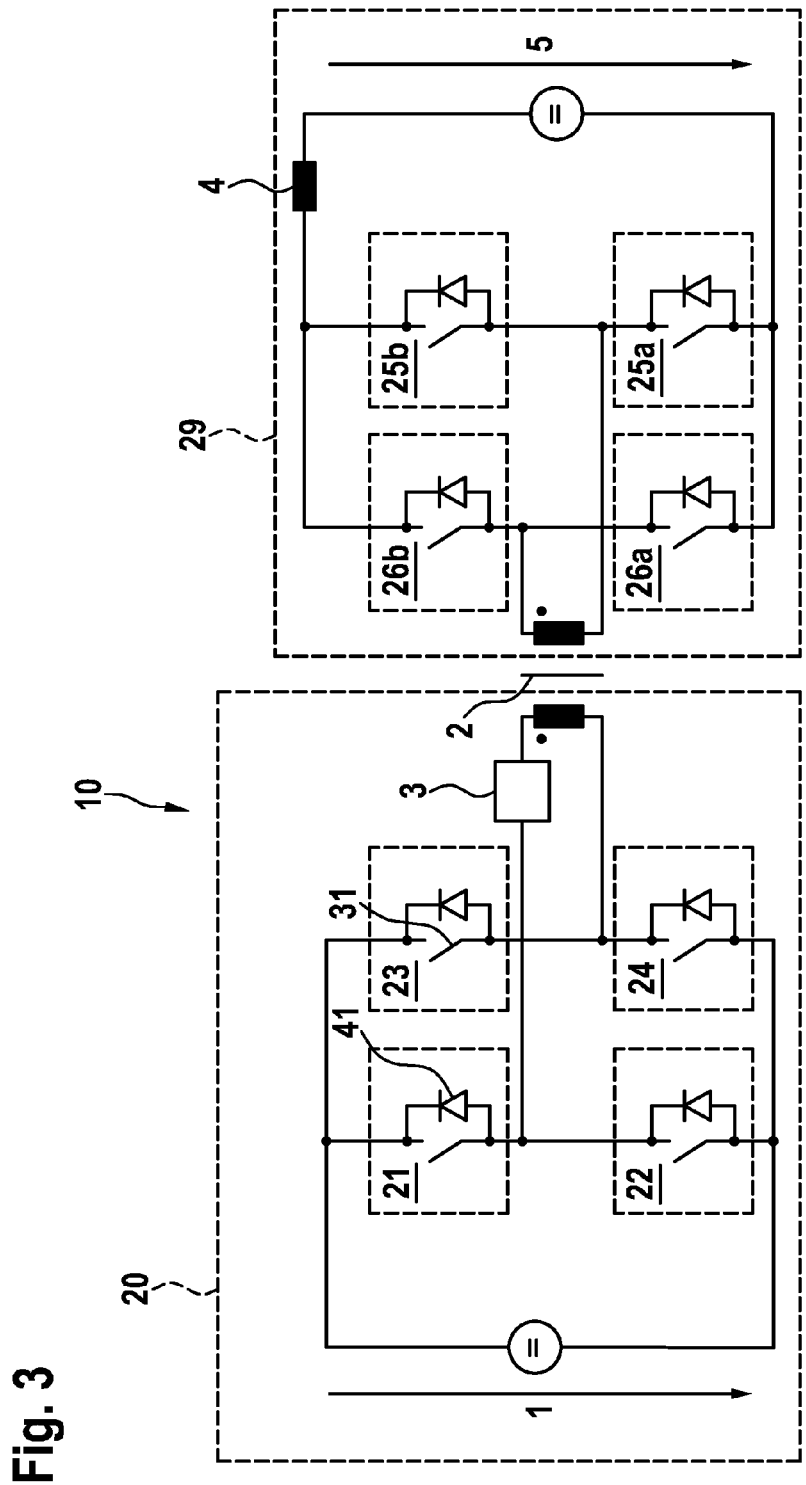
FIG. 3 shows a schematic depiction of a further exemplary bidirectional push-pull converter.

FIG. 3 shows a schematic depiction of another exemplary bidirectional push-pull converter.

The design and the functionality of the push-pull converter 10 depicted in FIG. 3 is similar to that in FIG. 1. In contrast to the push-pull converter 10 in FIG. 1, the low-voltage-side circuit 29 is also implemented as a full-bridge circuit in the exemplary embodiment of FIG. 3. Said full-bridge circuit comprises switching devices 25a, 26a, 25b, 26b as well as a throttle 4. All switching devices consist in each case of a transistor 31 and a diode 41. A DC voltage 1 can be applied to or respectively tapped at the high-voltage-side circuit 20 and a DC voltage 5 correspondingly on the low-voltage side. In the buck converter operating mode, the diodes 41 of the low-voltage-side circuit are used here as bridge rectifiers, in the boost converter operating mode, those of the high-voltage-side circuit. In the boost converter operating mode, as in the buck converter operating mode, the push-pull converter is in each case operated by means of a full-bridge actuation. In the boost converter operating mode, the transistors 31 of the high-voltage-side circuit 20 can also be used for short-circuiting the high-voltage winding of the transformer 2.

FIG. 4 shows a temporal progression diagram of actuating signals of a method for modulating the boost converter operating mode of a bidirectional push-pull converter according to another embodiment of the invention.

In FIG. 4, a method is depicted by way of example, as said method can be used for operating the push-pull converter from FIG. 3 as a boost converter. The method is basically very similar to that of FIG. 2b with the difference that the low-voltage-side circuit 29 is actuated in accordance with a full-bridge. In a time segment of a modulation cycle, diagonally arranged switching devices of the low-voltage-side circuit 29 are accordingly closed or respectively opened. In a first time segment [0,t1] of a modulation cycle, switching devices 26a and 25b are, for example, closed while switching devices 25a and 25b remain open. Exactly as in the method in FIG. 2b, either switching device 21 or 24 is closed in the first time segment [9,t1] and opened again in the second time segment. It is thus also ensured in this embodiment of the invention that a current flows at any time through the current sensor device 3 on the high-voltage side and thus no additional current sensor device is necessary on the low-voltage side.

The invention claimed is:
1. Method for modulating the boost converter operating mode of a push-pull converter (10) having:

a low-voltage-side circuit (29), which is designed to convert a DC voltage (5) applied to the low-voltage side into a low-voltage-side AC voltage, having a first low-voltage-side switching device (25*a*), a second low-voltage-side switching device (26*a*) and a throttle (4);

a transformer (2) having a low-voltage-side winding and high-side voltage winding, said transformer being designed to receive the low-voltage-side AC voltage at the low-voltage-side winding and to generate a high-voltage-side AC voltage at the high-voltage-side winding; and a high-voltage-side circuit (20), which is configured as a full-bridge rectifier in order to convert the high-voltage-side AC voltage into a high-voltage-side DC voltage (1), having a first (21) and a second rectification element (22), which form a first half bridge, and a third (23) and a fourth rectification element (24), which form a second half-bridge;

wherein at least the first (21) or the fourth rectification element (24) is designed as a switching device and wherein at least the second (22) or the third rectification element (23) is designed as a switching device;

wherein the method comprises the following steps:

closing the first low-voltage-side switching device (25*a*) in order to generate a first voltage at the transformer (2) and in order to feed energy into the transformer (2) and the throttle (4) whilst simultaneously short-circuiting the high-voltage-side winding via the first (21) or the fourth rectification element (24) during a first time segment ([0,t1]) of a modulation cycle;

opening the rectification element (21, 24) used for short-circuiting the high-voltage-side winding in order to generate a high-voltage-side DC voltage (1) during a second time segment ([t1,t2]) of the modulation cycle;

opening the first low-voltage-side switching device (25*a*) and closing the second low-voltage-side switching device (26*a*) in order to generate a second voltage at the transformer (2), which has a polarity opposite to the first voltage, whilst simultaneously short-circuiting the high-voltage-side winding via the second (22) and the third rectification element (23) of the second half-bridge during a third time segment ([t2,t3]) of the modulation cycle; and opening the rectification element (22, 23) used for short-circuiting the high-voltage-side winding in order to generate a high-voltage-side DC voltage (1) during a fourth time segment ([t3,t4]) of the modulation cycle.

2. Method according to claim 1, wherein the low-voltage-side circuit (21) is designed as a center-tap connection comprising the first low-voltage-side (25*a*) and the second low-voltage-side switching device (26*a*) as well as the throttle (4).

3. Method according to claim 1, wherein the low-voltage-side circuit (29) further comprises a third low-voltage-side switching device (25*b*) and a fourth low-voltage-side switching device (26*b*) and is designed as a full-bridge circuit comprising the first low-voltage-side (25*a*), the second low-voltage-side (26*a*), the third low-voltage-side (25*b*) and the fourth low-voltage-side switching device (26*b*) as well as the throttle (4); and the opening and the closing of the first low-voltage-side switching device (25*a*) is accompanied in each case by a simultaneous opening and closing of the fourth low-voltage-side switching device (26*b*); and the opening and the closing of the second low-voltage-side switching device (26*a*) is accompanied in each case by a simultaneous opening and closing of the third low-voltage-side switching device (25*b*).

4. Method according to claim 1, wherein the low-voltage-side and high-voltage-side switching devices (21, 22, 23, 24, 25*a*, 25*b*, 26*a*, 26*b*) comprise MOSFETs (31), IGBTs (31), JFETs (31), BJTs (31), or a combination of MOSFETS, IGBTS, or BJTs.

5. Method according to claim 4, wherein the low-voltage-side, the high-voltage-side, or both the low-voltage side and the high-voltage side switching devices (21, 22, 23, 24, 25*a*, 25*b*, 26*a*, 26*b*) are designed as synchronous rectifiers.

6. Method according to claim 1, wherein respectively one anti-parallel diode (41) is present in the case of the low-voltage-side, the high-voltage-side, of both the low-voltage and the high-voltage switching devices (21, 22, 23, 24, 25*a*, 25*b*, 26*a*, 26*b*).

7. Method according to claim 1, wherein the high-voltage-side rectification elements (21, 22, 23, 24) are designed as switching devices and wherein, in consecutive modulation cycles in the first time segment ([0,t1]), the first (21) as well as the fourth rectification element (24) and, in the third time segment ([t2,t3]), the second (22) as well as the third rectification element (23) are used alternately in each case for short-circuiting the high-voltage-side winding.

* * * * *